United States Patent [19]

Midooka et al.

[11] Patent Number: 4,708,351
[45] Date of Patent: Nov. 24, 1987

[54] SEALED JOINT INCLUDING WATER-ABSORPTIVE, WATER-SWELLING COATING AT JOINT INTERFACE SITE FOR USING LEAKAGE TO REPAIR LEAKS

[75] Inventors: Masanori Midooka; Takashi Kubo; Atsunobu Fujikawa; Masanori Motoda, all of Aichi, Japan

[73] Assignees: Toyoda Gosei Co., Ltd, Nishikasugai; Toyota Jidosha Kabushiki Kaisha, Toyota, both of Japan

[21] Appl. No.: 776,604

[22] Filed: Sep. 16, 1985

[30] Foreign Application Priority Data

Sep. 17, 1984 [JP] Japan .................................. 59-194149
Sep. 17, 1984 [JP] Japan .................................. 59-194150
Sep. 17, 1984 [JP] Japan .................................. 59-194151

[51] Int. Cl.$^4$ ............................................. F16J 15/10
[52] U.S. Cl. .................................... 277/184; 277/205; 296/93; 49/475
[58] Field of Search ............ 277/1, 184, 186, DIG. 6, 277/205; 296/93; 49/475

[56] References Cited

U.S. PATENT DOCUMENTS

| | | | |
|---|---|---|---|
| 2,094,691 | 10/1937 | Williams ................................. | 277/1 |
| 2,956,823 | 10/1980 | Benjamin et al. ................. | 277/188 R |
| 3,427,776 | 2/1969 | Lake et al. ............................. | 49/475 |
| 3,659,896 | 5/1972 | Smith et al. ........................... | 296/93 |
| 4,449,713 | 5/1984 | Ishido et al. ............................ | 277/1 |
| 4,546,033 | 10/1985 | Tsuchimoto et al. ................. | 277/1 |
| 4,558,875 | 12/1985 | Yamaji et al. ....................... | 277/227 |

FOREIGN PATENT DOCUMENTS 0037717 10/1981 European Pat. Off. .
0055848 7/1982 European Pat. Off. .
55-36176 3/1980 Japan ................................... 296/93

Primary Examiner—Robert S. Ward
Attorney, Agent, or Firm—Cushman, Darby & Cushman

[57] ABSTRACT

A sealing layer that seals the gap between the body or window glass and the weatherstrip attached to the door, window, trunk, roof side, etc. of an automobile, and also to a weatherstrip, automotive body, and glass plate provided with said sealing layer. The water-absorbing material swells upon absorption of water, sealing the fitting part of the weatherstrip. The water-absorbing material is made of a mixture of a water-absorbing polymer and rubber or synthetic resin. The sealing layer is formed on the fitting part of the weatherstrip, body, or window glass at which the weatherstrip is fitted to the automotive body or the window glass is fitted to the weatherstrip.

11 Claims, 14 Drawing Figures

SEALED JOINT INCLUDING WATER-ABSORPTIVE, WATER-SWELLING COATING AT JOINT INTERFACE SITE FOR USING LEAKAGE TO REPAIR LEAKS

BACKGROUND OF THE INVENTION

1. Field of the Invention

The present invention relates to a sealing layer that seals the gap between the body or window glass and the weatherstrip attached to the door, window, trunk, roof side, etc. of an automobile, and also to a weatherstrip, automotive body, and glass plate provided with said sealing layer.

2. Description of the Prior Art

The doors, windows, trunk, roof sides, etc. of an automobile are provided with a variety of sealing materials to prevent the entrance of rainwater and washing water.

An example of the sealing materials is a weatherstrip attached to the trunk of an automobile. A conventional one is briefly described with reference to FIG. 13. The opening (91) of the body at the trunk has a flange (92) which projects upward and the flange (92) is provided with a weatherstrip (93) in a continuous form. The trim (94) having an inverted U shaped cross-section has an integrally formed projecting seal lip (95) which comes into close contact with the outside edge of the opening (91) of the body. A plurality of retaining lips (96) are integrally formed on the opposing insides of the trim (94), so that they hold the flange (92) between them. The trim (94) also has an integrally formed drip lip (97) which extends on the outside of the body, with the end thereof in close contact with the opening (91) of the body. The trim (94) has an integrally formed ridge (98) at its upper part, and to the top of the ridge is bonded by vulcanization the seal pipe (99) which is pressed by the trunk lip (T).

The weatherstrip (93) of the structure mentioned above has the following disadvantage. If the weatherstrip (93) is not uniform in dimensions, the mounting of the weatherstrip is not complete, or the precision of the body construction is not so good, the weatherstrip (93) attached to the flange (92) does not provide complete sealing. That is, there remain spaces between the body opening (91) and the seal lip (95) and drip lip (97), or between the retaining lips (96) and the flange (92). These spaces permit rainwater and washing water to enter the body.

To eliminate this trouble, an adhesive or caulking material is forced into the part where the weatherstrip (93) is attached to the body. However, not only is this procedure troublesome, but also it has a disadvantage in that some portion of the injected adhesive enters the body because the filling amount cannot be confirmed.

On the other hand, a variety of sealing materials are used to keep water out in the part where a glass plate is mounted on the automotive body or a building sash. For example, a sealing material as shown in FIG. 14 is attached to the parts of an automotive body where the windshield, rear glass, and side glasses are mounted. The weatherstrip (83) made of synthetic rubber is attached to the body flange (82) and the glass (81) is fitted into the groove (84), with an adhesive (85) interposed between the weatherstrip (83) and the glass (81).

The above-mentioned sealing method still has some disadvantages. If the glass (81) does not accurately match the body (82), the weatherstrip (83) is deformed and a space is formed between the weatherstrip (83) and the glass (81). This space permits the entrance of water into the body. Moreover, the adhesive (85) applied to the groove (84) does not completely prevent the entrance of water because it is impossible to make sure visually that the adhesive (85) has been applied uniformly. In addition, the application of the adhesive (85) is a troublesome work.

SUMMARY OF THE INVENTION

It is an object of the present invention to provide a sealing layer that certainly seals the gap between the body or window glass and the weatherstrip attached to the door, window, trunk, roof side, etc. of an automobile.

It is another object of the present invention to provide a sealing layer that certainly prevents rainwater or washing water from entering the body even in the case where the weatherstrip is not uniform in dimensions and the glass is not accurately or completely mounted on the body.

It is further another object of the present invention to provide a weatherstrip, body, and glass plate which provide an improved sealing between the weatherstrip and the body or the glass plate at the doors, windows, trunk, and roof side of an automobile.

It is still further another object of the present invention to provide a glass plate which provides an improved sealing between the glass and the sash of a building or the frame of a view port on a machine.

The sealing layer of this invention comprises a water-swelling material that swells upon absorption of water to enhance sealing, said water-swelling material being applied to the part at which an automotive weatherstrip is fitted to another member.

The weatherstrip, automotive body, and glass of this invention are provided at their fitting parts with a sealing layer of water-swelling material.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
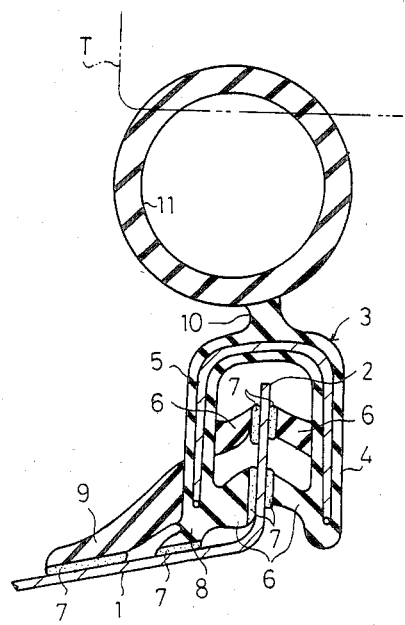
FIG. 1 is a sectional view of the first embodiment of this invention which is a weatherstrip for an automotive trunk.

The invention is now described with reference to FIG. 1 showing the first embodiment which is a weatherstrip for the automotive trunk.

The reference numeral 1 indicates the trunk opening of the body made of steel plate. At the edge of the opening, there is a flange (2) which projects upward. The reference numeral 3 indicates the entire body of a continuous weatherstrip fitted to the flange (2). The reference numeral 4 indicates the trim of the weatherstrip (3) which is made of ethylene-propylene rubber (EPDM) in U-shape. The reference numeral 5 indicates a core metal placed in the trim (4). It is formed in sections so that it does not impair the flexibility of the weatherstrip (3). The reference numeral 6 indicates two pairs of retaining lips which project opposite to each other inside the trim (4). Each pair of the opposing retaining lips hold the flange (2) between them. A sealing layer (7) made of water-swelling material is formed between the lip (6) and the flange (2).

The reference numeral 8 indicates a seal lip which is integrally formed on the weatherstrip. It projects from the weatherstrip and its end is in close contact with the opening (1) of the body. The reference numeral 9 indicates a drip lip which is integrally formed (by coextrusion) on the trim (4), and its end is in close contact with the opening (1) of the body. The sealing layer (7) is also formed between the seal lip (8) and the opening (1) and between the drip lip (9) and the opening (1).

The reference numeral 10 is a ridge integrally formed on the upper part of the trim (4). To the top of the ridge is bonded (by vulcanization) a round seal pipe (11) made of EPDM, which is pressed by the trunk lid (T) when it is closed.

The water-swelling material as mentioned above means any material that swells upon absorption of water. In this embodiment, it is a mixture of carboxymethyl cellulose (as a water-absorbing polymer) and natural rubber (NR).

The sealing layer (7) is formed by applying a solution of the water-swelling material in an organic solvent (e.g., toluene) to the specified part of the weatherstrip (3), followed by drying and heating for vulcanization.

The water-swelling material is not limited to the one mentioned above. It may be a mixture of a water-absorbing polymer and a synthetic resin or a formable water-absorbing polymer alone. A durable one is a mixture of a water-absorbing polymer and a durable rubber or synthetic resin.

Examples of the water-absorbing polymer include carboxymethyl cellulose, starch-polyacrylonitrile hydrolyzate, starch-polyacrylate, polyacrylonitrile hydrolyzate, and sodium polyacrylate hydrolyzate.

Examples of the rubber to be mixed with the water-absorbing polymer include natural rubber, ethylene-propylene rubber (EPDM and EPM), chloroprene rubber (CR), nitrile rubber (NBR), and styrene-butadiene rubber (SBR). Examples of the synthetic rubber to be mixed with the water-absorbing polymer include polypropylene (PP), polyethylene (PE), and polyvinyl chloride (PVC).

Examples of the organic solvent include volatile solvent such as toluene, trichloroethylene, and benzene.

The above-mentioned water-swelling material may be used in the form of foam having a density of 0.4 to 0.6 g/cm$^3$. The water absorption of a foam is greater than five times that of a solid. The foam density may range from 0.1 to 0.9 g/cm$^3$.

The embodiment of the above-mentioned structure will fail in sealing if the weatherstrip (3) is not accurately and completely mounted on the body (1, 2), or if the weatherstrip (3) is degraded after use for a long period of time. The failure is a loss of close contact or the formation of a gap between the weatherstrip (3) and the body (1, 2). When rainwater or washing water enters the gap, the sealing layer (7) formed on the respective ends of the lips (6, 8, 9) absorbs water to swell.

Thus the sealing layer (7) fills the gap and restores the sealing, preventing the entrance of water into the body. In addition, this embodiment does not need the injection of an adhesive, because the sealing layer (7) has previously been formed on the weatherstrip (3).

The second embodiment of this invention, which is a door weatherstrip mounted on the automotive window frame, is described with reference to FIG. 2.

The reference numeral 21 denotes a door of steel plate having a channel (22) formed on its side. The reference numeral 23 indicates the whole body of the weatherstrip fitted to the side of the door (21). The engaging part (24) of the weatherstrip (23) is fitted into the channel (22). It is made of EPDM sponge rubber. The sealing layer (7) is formed on the engaging part (24) and other parts of the weatherstrip which come into contact with the side of the door, as in the above-mentioned embodiment.

The reference numeral 27 indicates an oval seal pipe which is integrally formed (by coextrusion) on the weatherstrip. It projects sideward from the engaging part (24). The reference numeral 28 indicates a seal lip integrally formed on the weatherstrip. It also projects sideward from the engaging part (24). The seal pipe (27) and the seal lip (28) are pressed against the edge (B) of the opening of the body when the door is closed.

This embodiment produces the same effect as the above-mentioned first embodiment because the sealing layer (7) is formed between the weather strip (23) and the channel (22) so that it swells when rainwater or washing water infiltrates between them.

Figure 3:
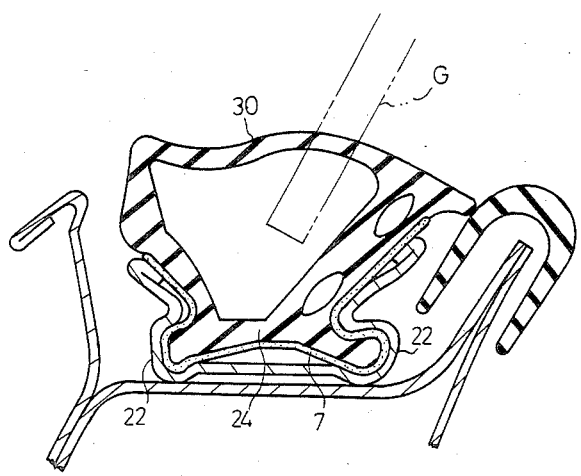
FIG. 3 is a sectional view of the third embodiment of this invention which is a weatherstrip for an automotive roof side.

The third embodiment of this invention, which is a weatherstrip for the automotive roof side, is described with reference to FIG. 3. This embodiment is equivalent to the second embodiment except that the seal pipe (27) and seal lip (28) are replaced by the sealing part (30) for the window glass (G). Therefore, this embodiment produces the same effect as that of the second embodiment.

Figure 4:
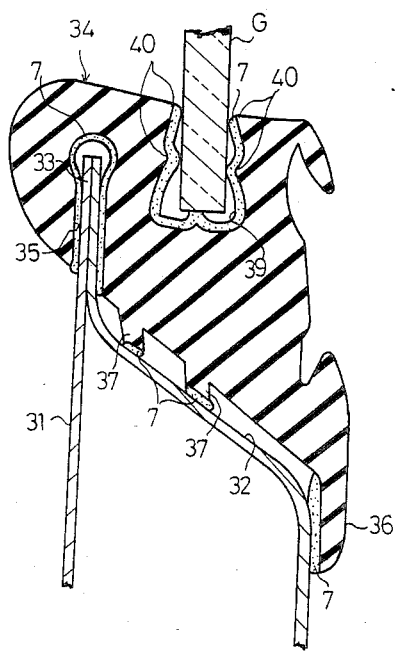
FIG. 4 is a sectional view of the fourth embodiment of this invention which is a weather strip for an automotive stationary window glass.

The fourth embodiment of this invention, which is a weatherstrip for the automotive stationary window glass, is described with reference to FIG. 4.

The reference numeral 31 indicates a doby opening which is made of steel plate and formed at an automobile window. Also provided therein are the edge (32) and the flange (33) which peripherally extends. The reference numeral 34 indicates the entire weatherstrip of EPDM which is provided to cover the flange (33). The EPDM weatherstrip is fixedly engaged with the body opening (31) by means of the narrowed portion (35) of the flange (33) and the pressing lip (36) to press the body surface down.

The reference numeral 37 indicates a pair of the seal lip which is integrally formed by coextrusion on the weatherstrip (34) at its body-contacting surface. The reference numeral 39 is a channel where window glass (G) is inserted. Sets of holding lips (40) are protrudingly formed inside the channel. The seal layer (7) is, like in the case of foregoing embodiment, formed on the narrowed portion (35), the channel (39), the holding lip (36), and its edge-contacting areas as well as the edge-contacting areas of the seal lips (37).

This embodiment also produces the same effect as that of the above-mentioned embodiment.

Figure 5:
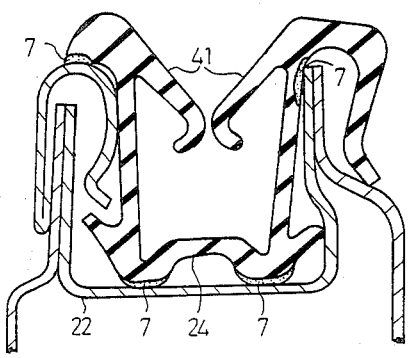
FIG. 5 is a sectional view of the fifth embodiment of this invention which is a weatherstrip used as a glass run on an automotive window frame.

The fifth embodiment of this invention, which is a weatherstrip as a glass run of the automotive window frame, is described with reference to FIG. 5. This embodiment is equivalent to the second embodiment except that the seal pipe (27) and seal lip (28) are replaced by the slide sealing part (41) for the window glass (G). Therefore, this embodiment also produces the same effect as that of the second embodiment.

Figure 6:
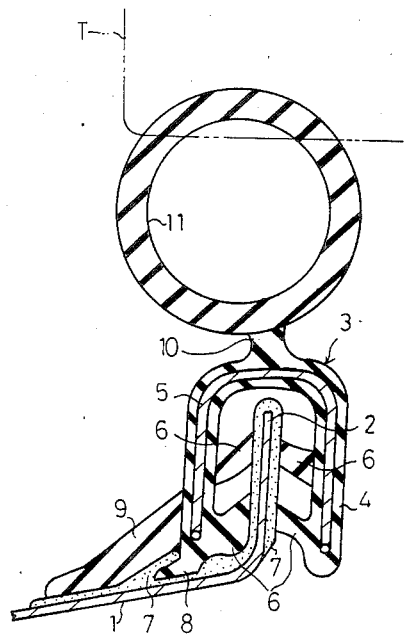
FIG. 6 is a sectional view of the sixth embodiment of this invention which is a body to which is fitted a weatherstrip for an automotive trunk.

The sixth embodiment of this invention, which is an automotive body to which is fitted the weatherstrip for the automotive trunk, is described with reference to FIG. 6.

This embodiment differs from the above-mentioned first embodiment in the position where the sealing layer (7) is formed. The sealing layer (7) is formed all over the body opening (1) and the flange (2). It extends from the parts where the drip lip (9) comes into contact with the body opening (1) to the part where the retaining lips (6) come into contact with the flange (2).

If a gap is formed between the weatherstrip (3) and the body (1, 2) and rainwater or washing water enters the gap, the sealing layer formed on the body (1, 2) absorbs water to swell. Thus, as in the above-mentioned first embodiment, the sealing layer (7) fills the gap and presses against the weatherstrip to ensure sealing and prevent the entrance of water into the body.

Figure 2:
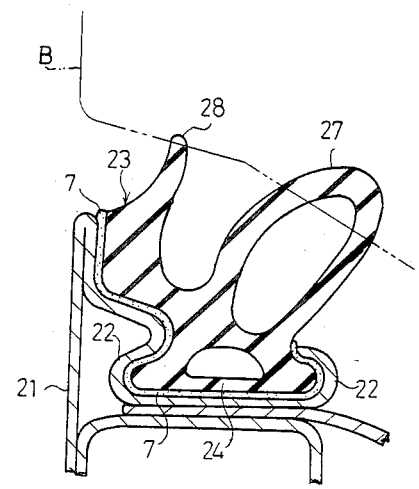
FIG. 2 is a sectional view of the second embodiment of this invention which is a weatherstrip for an automotive door.

The seventh embodiment of this invention, which is a body to which is fitted a weatherstrip for the automotive door, differs from the second embodiment shown in FIG. 2 in that the sealing layer (7) is formed on the inside of the channel (22) of the door (21), whereas the sealing layer (7) is formed on the engaging part (24) of the weatherstrip (23) in the second embodiment. Therefore, this embodiment also produces the same effect as that of the second embodiment when water enters the gap between the channel (22) and the weatherstrip (23).

Figure 7:
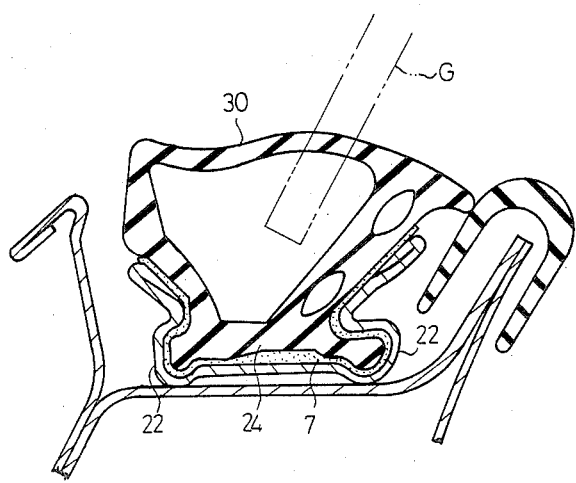
FIG. 7 is a sectional view of the eighth embodiment of this invention which is a body to which is fitted a weatherstrip for an automotive roof side.

The eighth embodiment of this invention, which is a body to which is fitted a weatherstrip for the automotive roof side, is described with reference to FIG. 7. This embodiment is equivalent to the above-mentioned third embodiment except that the sealing layer (7) is formed on the inside of the channel (22) to which the weatherstrip is fitted. Therefore, this embodiment also produces the same effect as that of the third embodiment.

Figure 8:
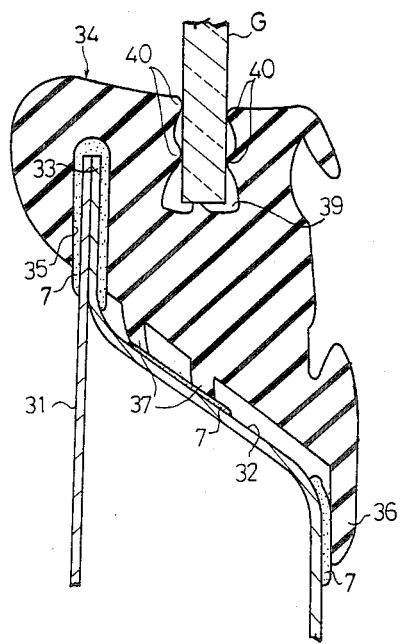
FIG. 8 is a sectional view of the ninth embodiment of this invention which is a body to which is fitted an automotive stationary window glass.

The ninth embodiment of this invention, which is a body to which the automotive stationary window glass is fitted, is described with reference to FIG. 8. This embodiment is equivalent to the above-mentioned fourth embodiment except that the sealing layer (7) is formed on the end (32) of the opening (31) with which the holding part (35), the pressing lip (36), and the seal lips (37) come into contact. Therefore, this embodiment produces the same effect as that of the above-mentioned embodiments.

Figure 9:
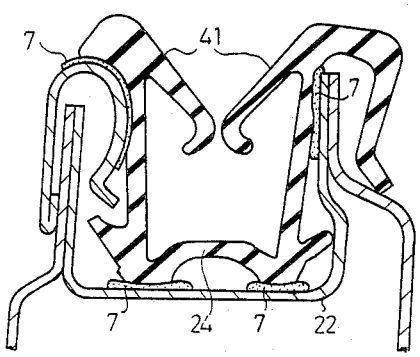
FIG. 9 is a sectional view of the tenth embodiment of this invention which is a body to which is fitted a weatherstrip used as a glass run on an automotive window frame.

The tenth embodiment of this invention, which is a body to which is fitted the weatherstrip as the glass run of the automotive window frame, is described with reference to FIG. 9. This embodiment is equivalent to the above-mentioned fifth embodiment except that the sealing layer (7) is formed on the inside of the channel (22) of the body where the weatherstrip is mounted. Therefore, this embodiment also produces the same effect as that of the fifth embodiment.

Figure 11:
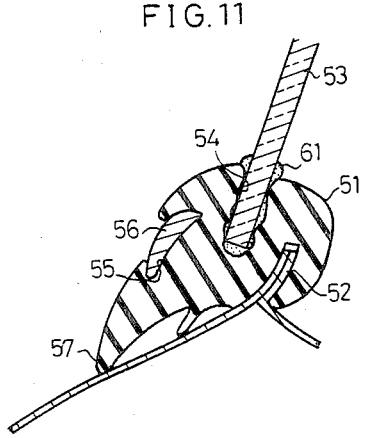
FIG. 10 and FIG. 11 are an exploded perspective view and a sectional view, respectively, of the eleventh embodiment of this invention which is an automotive windshield.
Figure 10:
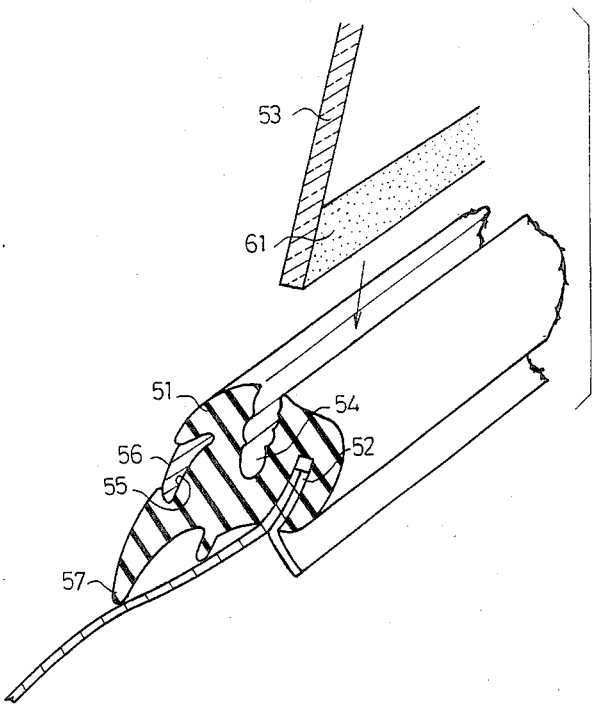

The eleventh embodiment of this invention, which is a sealing structure for the automotive windshield, is described with reference to FIGS. 10 and 11. The reference numeral 51 indicates a weatherstrip fixed to the flange (52). On the top of the weatherstrip, there is formed a fitting groove (54) into which the windshield (53) is fitted. The reference numeral 56 indicates a molding fitted into the recess (55) formed on the outside (left side in FIG. 10) of the weatherstrip (52). It is an ornament for the periphery of the windshield. The reference numeral 57 indicates a lip which projects downward from the lower part of the said recess (55). The end of the lid is pressed against the body, which prevents water from entering the body along the flange (52).

The reference numeral 61 indicates a sealing layer formed on the end of the windshield (53). The width of the sealing layer is a little greater than the depth of the fitting groove (54). The sealing layer (61) together with the windshield (53) are fitted into the fitting groove (54).

The sealing layer (61) is made of a water-swelling material. In other words, it is formed by applying a solution of a water-swelling material in an organic solvent (e.g., toluene) to the end of the windshield (53), followed by drying and heating for vulcanization.

In the case where the windshield-to-body fitting is not accurate, or when the weatherstrip (51) is degraded after use for a long period of time, a gap is formed between the fitting groove (54) and the windshield (53). When rainwater or washing water enters the gap, the sealing layer (61) made of a water-swelling material absorbs water to expand. Thus the sealing layer (61) fills the gap and presses against the fitting groove (54), whereby preventing the entrance of water into the body. In the meantime, the structure that the sealing layer (61) is formed on the windshield (53) simplifies the assembly work.

Figure 12:
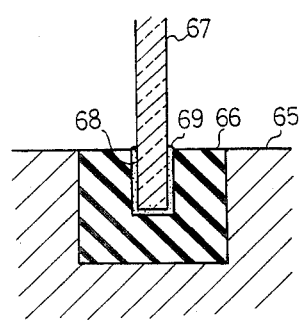
FIG. 12 is a sectional view of the twelfth embodiment of this invention which is a building glass plate.
Figure 13:
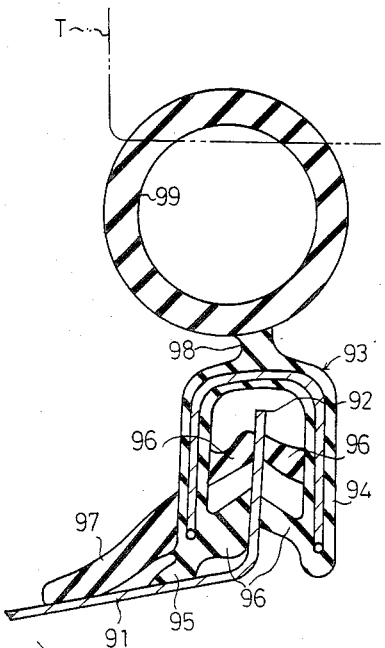
FIG. 13 is a sectional view of a conventional weatherstrip for an automotive trunk and a body to which the weatherstrip is fitted.
Figure 14:
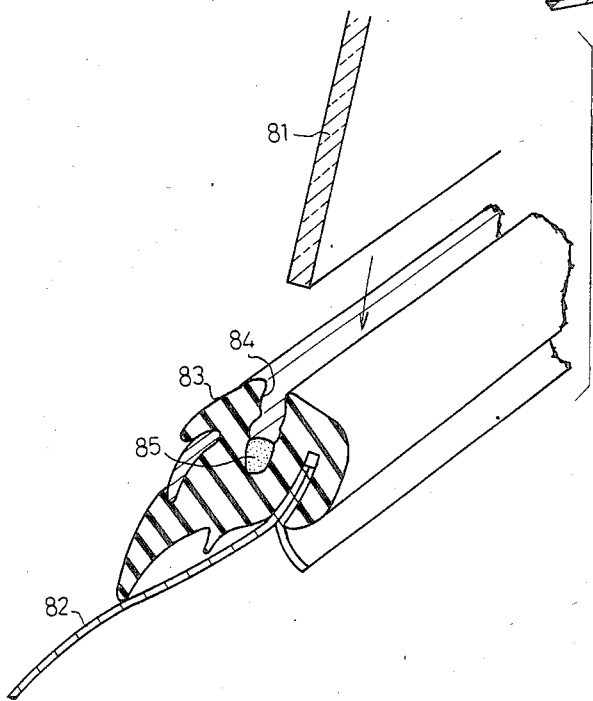
FIG. 14 is an exploded perspective view of a conventional automotive windshield.

The twelfth embodiment of this invention, which is a building glass plate, is described with reference to FIG. 12.

The reference numeral 66 indicates a rubber seal attached to the building window sash (65). The rubber seal (66) has at its center a fitting groove (68) into which the window glass (67) is fitted. The reference numeral 69 is a sealing layer formed on the end of the window glass (67). The width of the sealing layer is a little greater than the depth of the fitting groove (68). The sealing layer (69) together with the glass plate (67) are fitted into the fitting groove (68). The sealing layer is made of a water-swelling material as in the above-mentioned embodiments. Thus this embodiment also produces the same effect as that of the above-mentioned embodiments.

The present invention is not restricted to the above-mentioned embodiments; but it may be reduced to practice as follows:

(1) In the above-mentioned embodiments, vulcanization is accomplished by heating the weatherstrip (3, 23, 34) and the windshield (53). In another embodiments, vulcanization is accomplished naturally before or after the weatherstrip (3, 23, 34) and the windshield (53) are attached to the automotive body.

(2) The water-swelling material may be mixed with an epoxy-, urethane-, PE-, or rubber-based adhesive.

(3) The water-swelling material may be applied by brushing, dipping, or spraying.

(4) The water-swelling material may also be applied to the seal pipe (11, 27), seal lip (28), sealing part (30), and slide seal part (41) on the weatherstrip (3, 23).

(5) The weatherstrip (3, 23, 34) may be made of synthetic rubber or synthetic resin.

(6) The amount and expansion ratio of the water-swelling material may be properly selected according to the desired sealing pressure.

(7) The windshield (53) and window glass (67) in the eleventh and twelth embodiments may be transparent resin plates such as polyacrylate and polycarbonate.

(8) In the eleventh and twelfth embodiments, the width of the sealing layer (61, 69) is specified; but the sealing layer (61, 69) may be formed only on the bottom of the fitting groove (54, 68) to which the windshield (53) or the window glass (67) is fitted.

(9) This invention may be reduced to practice for the glass plate of building and construction equipment and for the glass plate of inspection hole on the factory machines, in addition to the windshield (53) and building glass plate (67) in the eleventh and twelfth embodiments.

As many apparently widely different embodiments of this invention may be made without departing from the spirit and scope thereof, it is to be understood that the invention is not limited to the specific embodiments thereof except as defined in the appended claims.

What is claimed is:

1. A sealed joint, comprising:
   a first member;
   a second member;
   one of said first and second members having a portion fitted into a recess provided in the other of said first and second members;
   one of said first and second members on said portion and the other of said first and second members in said groove constituting a seal for normally sealing with the respective said other of said first and second members in said groove and said one of said first and second members on said portion for preventing infiltration of rain and washing water from one side of said sealed joint to an opposite side of said sealed joint;
   a layer of water-swelling material, which swells upon absorption of water to enhance sealing, being provided between said first and said second members at least partly within said groove, this layer being present in a sufficient quantity to re-establish a seal between said first and second members should said seal for normally sealing fail and leak water so that such water contacts said layer of water-swelling material and causes said layer to swell.

2. A sealed joint as claimed in claim 1, wherein the water-swelling material is made of a mixture of a water-absorbing polymer and a rubber or synthetic resin.

3. A sealed joint as claimed in claim 2, wherein the water-absorbing polymer is any one of the carboxymethyl cellulose, starch-polyacrylonitrile hydrolyzate, starch-polyacrylate, polyacrylonitrile hydrolyzate, and sodium polyacrylate hydrolyzate.

4. A sealed joint as claimed in claim 2, wherein the rubber is any one of natural rubber, ethylene-propylene rubber, chloroprene rubber, nitrile rubber, and styrene-butadiene rubber.

5. A sealed joint as claimed in claim 2, wherein the synthetic resin is any one of polypropylene, polyethylene, and polyvinyl chloride.

6. A sealed joint as claimed in claim 1, wherein the water-swelling material is a foamed material.

7. A sealed joint as claimed in claim 6, wherein the foamed material has such an expansion ratio that the density of the water-swelling material is 0.1 to 0.9 g/cm$^3$.

8. The sealed joint of claim 1, wherein:
   one of said first and second members is made of rubber.

9. The sealed joint of claim 8, wherein:
   the other of said first and second members is an automotive body sheet member.

10. The sealed joint of claim 9, wherein:
    said rubber member is an automotive weatherstrip.

11. The sealed joint of claim 1, wherein:
    one of said first and second members is a sheet of window glazing material and the other of said first and second members is a window framing member.

* * * * *